United States Patent
Takano et al.

(10) Patent No.: US 10,620,823 B2
(45) Date of Patent: Apr. 14, 2020

(54) INFORMATION PROCESSING DEVICE AND DISPLAYING METHOD FOR SWITCHING BETWEEN FACEPLATES FOR CONTROLLING FIELD DEVICES

(71) Applicant: YOKOGAWA ELECTRIC CORPORATION, Tokyo (JP)

(72) Inventors: Naoto Takano, Tokyo (JP); Ayako Kono, Tokyo (JP); Jun Kobayashi, Tokyo (JP); Motoichi Kuwatani, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 223 days.

(21) Appl. No.: 15/265,916

(22) Filed: Sep. 15, 2016

(65) Prior Publication Data

US 2017/0083184 A1 Mar. 23, 2017

(30) Foreign Application Priority Data

Sep. 18, 2015 (JP) .................................. 2015-185018

(51) Int. Cl.
| | |
|---|---|
| *G06F 3/0484* | (2013.01) |
| *G06F 3/0488* | (2013.01) |
| *G06T 11/20* | (2006.01) |
| *G05B 19/409* | (2006.01) |
| *G05B 23/02* | (2006.01) |
| *G06F 3/0485* | (2013.01) |

(52) U.S. Cl.
CPC ....... *G06F 3/04883* (2013.01); *G05B 19/409* (2013.01); *G05B 23/0272* (2013.01); *G06F 3/0485* (2013.01); *G06F 3/04842* (2013.01); *G06F 3/04847* (2013.01); *G06T 11/206* (2013.01); *G05B 2219/32128* (2013.01); *G05B 2219/36168* (2013.01)

(58) Field of Classification Search
CPC .............. G05B 19/409; G05B 23/0272; G06F 3/04847
See application file for complete search history.

(56) References Cited

U.S. PATENT DOCUMENTS

| | | | | |
|---|---|---|---|---|
| 7,483,917 | B2 * | 1/2009 | Sullivan | G06T 17/05 |
| 9,652,137 | B2 * | 5/2017 | Guan | G06F 3/04847 |
| 10,133,443 | B2 * | 11/2018 | Von Dehsen | H04L 12/2807 |
| 2004/0095397 | A1 * | 5/2004 | Nojima | G06F 3/0486 715/838 |
| 2004/0113894 | A1 | 6/2004 | Yamamoto et al. | |
| 2008/0244449 | A1 | 10/2008 | Morrison et al. | |

(Continued)

FOREIGN PATENT DOCUMENTS

| | | |
|---|---|---|
| CA | 2050957 A1 | 12/1992 |
| JP | 5-79858 A | 3/1993 |

(Continued)

*Primary Examiner* — Alvin H Tan
(74) *Attorney, Agent, or Firm* — Sughrue Mion, PLLC

(57) ABSTRACT

An information processing device includes a display configured to display a first graphical faceplate representing a state of a control target, an operation unit which is used for operating the first graphical faceplate, and a controller configured to switch the first graphical faceplate displayed by the display to a second graphical faceplate for operating the control target based on an operation performed by the operation unit.

20 Claims, 8 Drawing Sheets

(56) References Cited

U.S. PATENT DOCUMENTS

| | | | |
|---|---|---|---|
| 2011/0087977 A1 | 4/2011 | Campney et al. | |
| 2014/0200426 A1* | 7/2014 | Taub | A61B 5/14532 600/347 |
| 2015/0073583 A1 | 3/2015 | Karl et al. | |
| 2015/0261432 A1* | 9/2015 | Yamamoto | G06F 3/04886 715/771 |

FOREIGN PATENT DOCUMENTS

| | | |
|---|---|---|
| JP | 2706796 B2 | 1/1998 |
| JP | 3060197 U | 7/1999 |
| JP | 2008-146371 A | 6/2008 |
| JP | 2012-99063 A | 5/2012 |
| JP | 2013-190894 A | 9/2013 |
| JP | 2014-137785 A | 7/2014 |
| JP | 2015-115841 A | 6/2015 |
| JP | 2015-145749 A | 8/2015 |

* cited by examiner

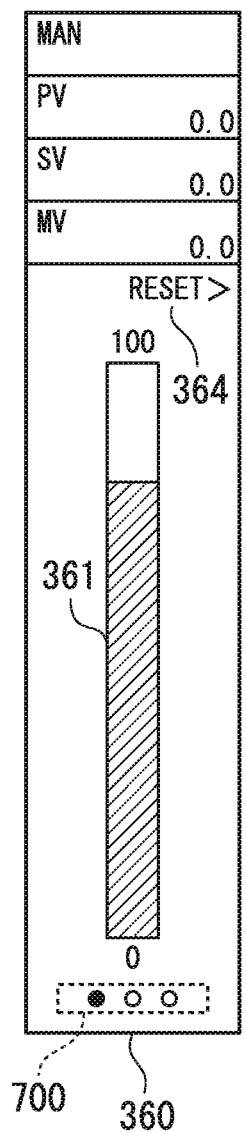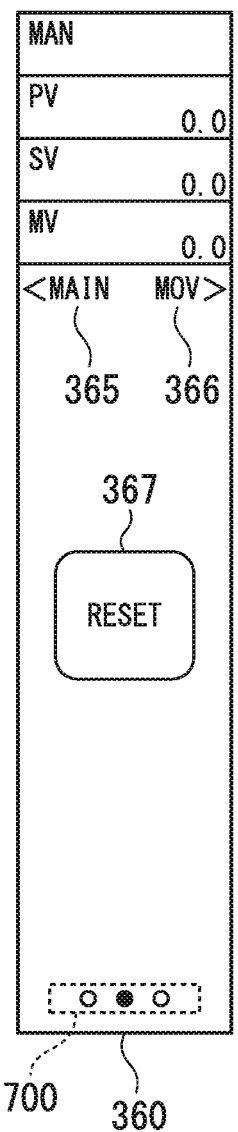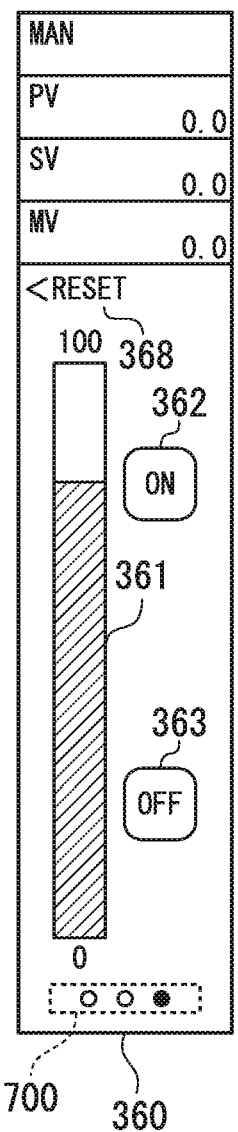

INFORMATION PROCESSING DEVICE AND DISPLAYING METHOD FOR SWITCHING BETWEEN FACEPLATES FOR CONTROLLING FIELD DEVICES

BACKGROUND

Technical Fields

The disclosure relates to an information processing device and a displaying method.

Priority is claimed on Japanese Patent Application No. 2015-185018, filed Sep. 18, 2015, the contents of which are incorporated herein by reference.

Related Art

In a plant and a factory (hereinafter, called simply "plant" as a generic name of them), a process control system is established, and an advanced automatic operation is implemented. The process control system controls various types of state quantity (for example, pressure, temperature, and flow quantity) in an industrial process. In the process control system, a plurality of sensors (a smoke sensor, a flame sensor, a gas sensor, a flowmeter, a thermometer, and so on) and a plurality of actuators (valve, and so on) are connected to a control device, and the plant, such as an oil plant, a steel plant, and a chemical plant, is controlled.

For example, an information processing device which displays a graphical faceplate (e.g., display of instrument information or function) is disclosed in Japanese Patent No. 2706796. An operator monitors and operates the plant with reference to the graphical faceplate displayed on the information processing device. For example, the graphical faceplate is an analog-type graphical faceplate where a bar graph is displayed, a switch-type graphical faceplate where on/off information of a switch is displayed, an alarm-type graphical faceplate showing an alarm level of a device, a digital graphical faceplate, or the like.

For example a bar graph is displayed in a graphical faceplate of a smoke sensor. If the smoke sensor detects smoke, the information processing device changes a bar of the bar graph in accordance with a measurement value of the smoke sensor. If the measurement value of the smoke sensor exceeds a predetermined threshold smoke sensor outputs an alarm.

Once the smoke sensor outputs an alarm, the alarm cannot be canceled if a power source of the smoke sensor is not reset. This is because it is necessary to cancel the alarm after the operator understands the cause of the smoke and copes with the smoke. It is necessary that a relay turns off a line for supplying electric power to the smoke sensor in order to reset the power source of the smoke sensor.

A conventional information processing device displays a bar graph and a reset button for resetting the smoke sensor in the graphical faceplate. However, if the reset button is always displayed in the graphical faceplate, the visibility of the graphical faceplate is spoiled, and a risk of an operator's operation mistake with respect to the reset button is increased.

SUMMARY

An information processing device may include a display configured to display a first graphical faceplate representing a state of a control target, an operation unit which is used for operating the first graphical faceplate, and a controller configured to switch the first graphical faceplate displayed by the display to a second graphical faceplate for operating the control target based on an operation performed by the operation unit.

Further features and aspects of the present disclosure will become apparent from the following detailed description of exemplary embodiments with reference to the attached drawings.

BRIEF DESCRIPTION OF THE DRAWINGS

FIG. 8A is a drawing illustrating a main screen (bar graph display screen) of the graphical faceplate 360 of the fourth embodiment.

FIG. 8B is a drawing illustrating a sub screen 1 (reset button display screen) of the graphical faceplate 360 of the fourth embodiment.

FIG. 8C is a drawing illustrating a sub screen 2 (MOV button display screen) of the graphical faceplate 360 of the fourth embodiment.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide an information processing device and a displaying method which can improve a visibility of a graphical faceplate and reduce a risk of an operator's operation mistake.

Hereinafter, an information processing device and a displaying method of embodiments will be described with reference to drawings.

First Embodiment

Figure 1:
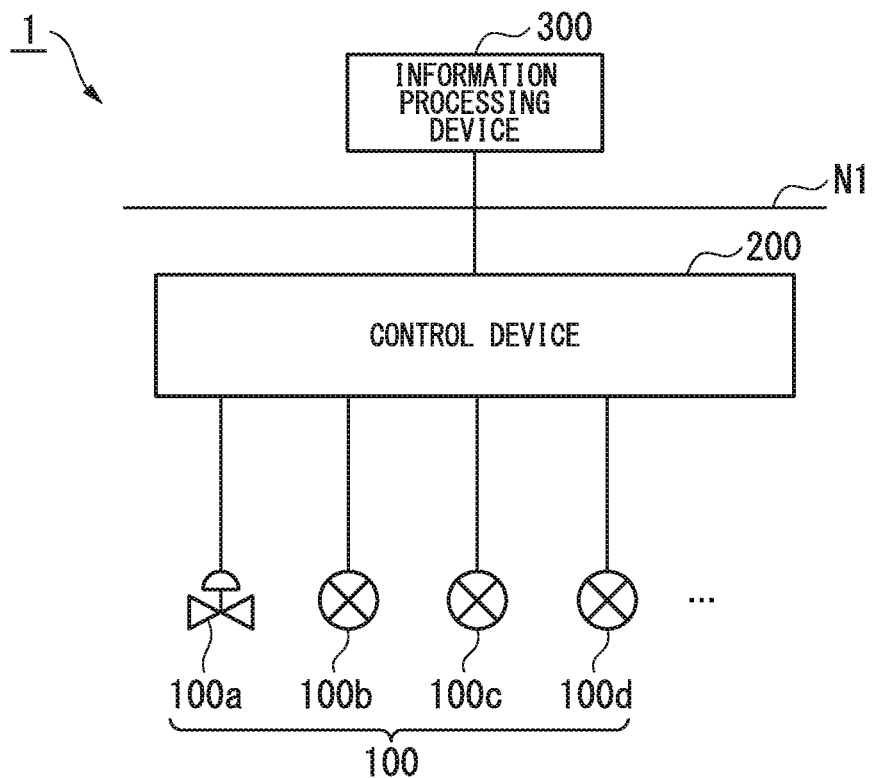
FIG. 1 is a block diagram illustrating a whole configuration of a process control system 1 of the first embodiment.

FIG. 1 is a block diagram illustrating a whole configuration of a process control system 1 of the first embodiment. As shown in FIG. 1, the process control system 1 is equipped with a field device 100, a control device 200, and an information processing device 300. The process control system 1 is established in a plant.

The plant includes an industrial plant such as a chemical industrial plant, a plant managing and controlling a wellhead (for example, a gas field and an oil field), a plant managing and controlling a generation of electric power (for example, water power, fire power, and nuclear power), a plant managing and controlling a power harvesting (for example, solar power and wind power), a plant managing and controlling water supply and sewerage systems, a dam, and so on.

The field device 100 is such as a sensor device (for example, a smoke sensor, a flame sensor, a gas sensor, a flowmeter, a thermometer), a valve device (for example, a flow control valve and an on-off valve), an actuator device (for example, a fan and a motor), and other devices installed in the plant. The field devices 100a to 100d are connected to the control device 200.

The control device 200 and the information processing device 300 are connected to the network N1. The network N1 is a network such as Ethernet (registered trademark). The network N1 may be a wireless network which can perform wireless communication in conformity with wireless communication standards, such as Wi-Fi (registered trademark), WiMAX (registered trademark), 3G/LTE (registered trademark), and so on. For example, the information processing device 300 is a device which is operated by an operator, and the information processing device 300 is used for monitoring process.

Figure 2:
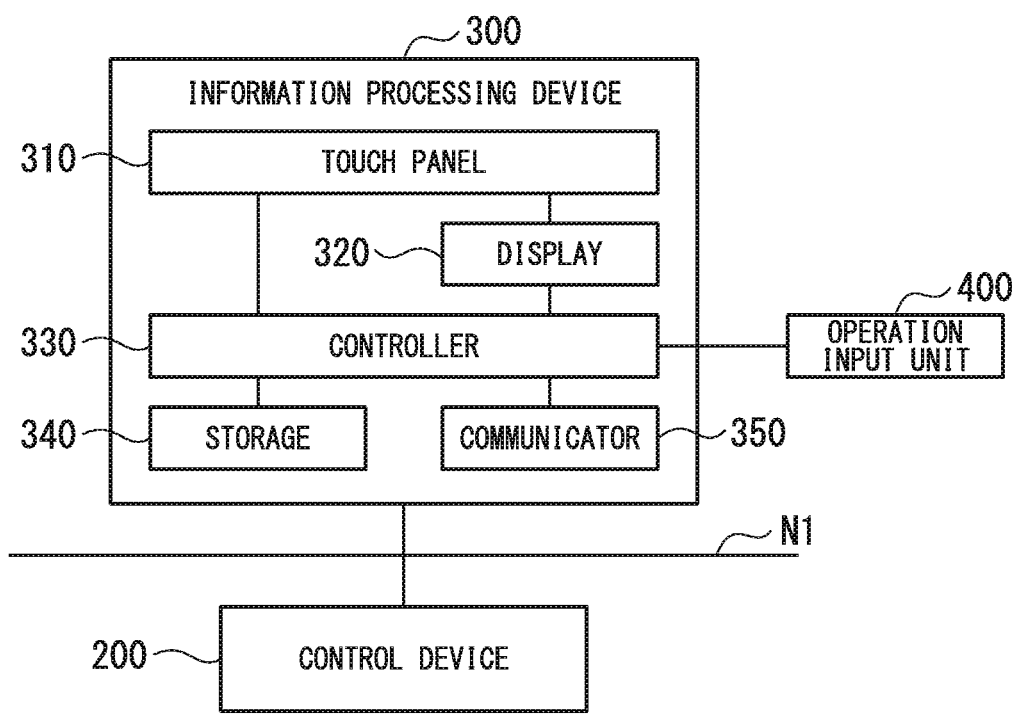
FIG. 2 is a block diagram illustrating a detail configuration of the information processing device 300 of the first embodiment.

FIG. 2 is a block diagram illustrating a detail configuration of the information processing device 300 of the first embodiment. As shown FIG. 2, the information processing device 300 is equipped with a touch panel 310, a splay 320, a controller 330, storage 340, a communicator 350, and an operation input unit 400.

The touch panel 310 is an operation unit to which the operator can perform flick operation and tap operation. The display 320 is a display unit such as a liquid crystal display. The controller 330 is equipped with a processor, such as CPU (Central Processing Unit), and a memory which stores a program executed by the processor. The controller 330 may be hardware, such as LSI (Large Scale integration) and ASIC (Application Specific Integrated Circuit).

For example, the storage part 340 includes a hard disk, and stores a process value (measurement value) of the field device 100. The communicator 350 communicates with the control device 200 through the network N1. The operation input unit 400 is an operation unit, such as a mouse which operates a cursor displayed on the display 320 and selects a button displayed on the display 320.

Figure 3:
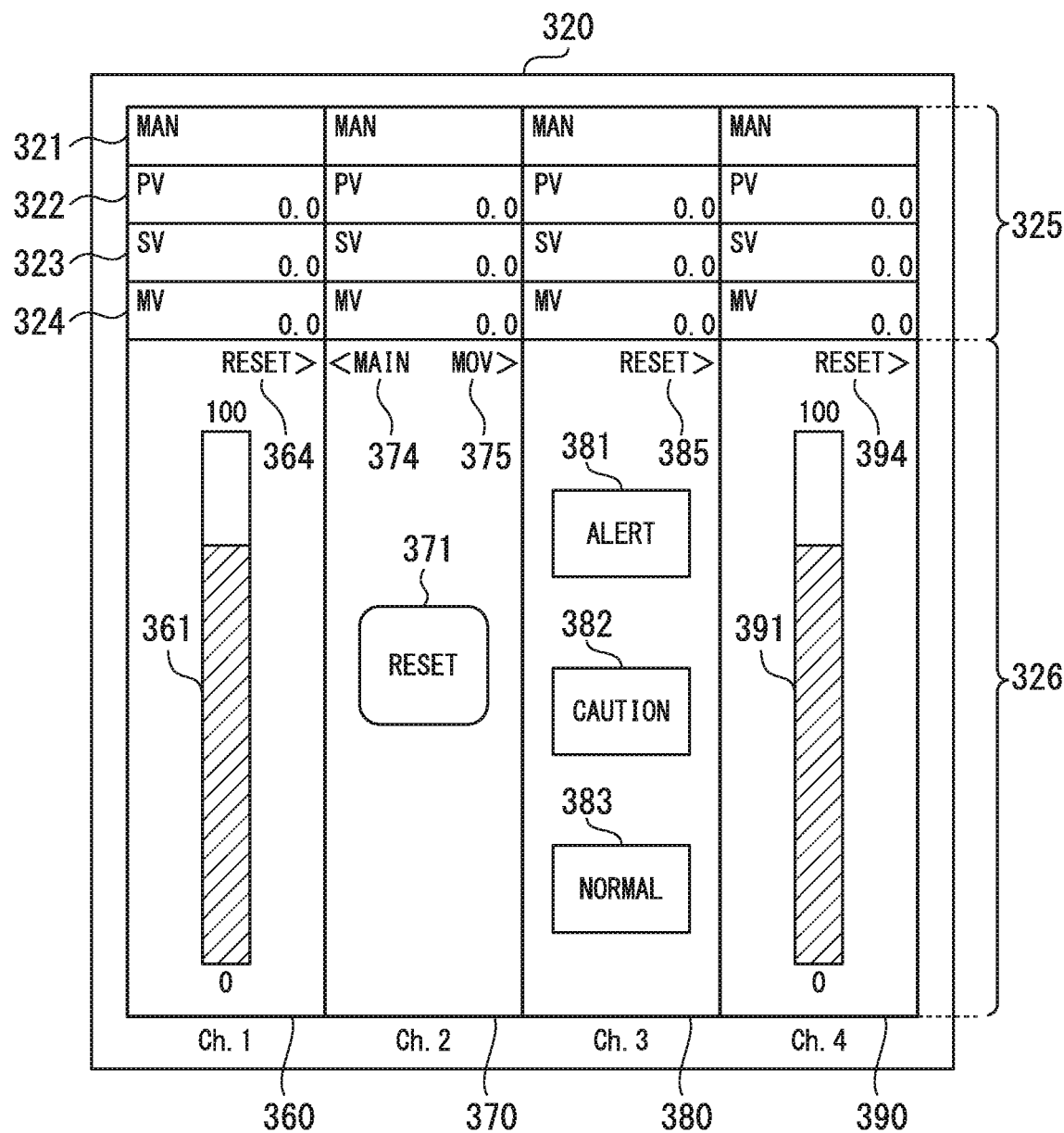
FIG. 3 is a drawing illustrating a graphical faceplate displayed on the display 320 of the first embodiment.

FIG. 3 is a drawing illustrating a graphical faceplate displayed on the display 320 of the first embodiment. As shown in FIG. 3, the display 320 displays graphical faceplates respectively corresponding to the field devices 100a to 100d side by side. Here, although four graphical faceplates are displayed side by side as an example, the number of graphical faceplates displayed on the display 320 is not limited thereto.

A graphical faceplate 360 is a graphical faceplate corresponding to a field device (for example, a gas sensor) of a channel 1. A graphical faceplate 370 is a graphical faceplate corresponding to a field device (for example, a switch of pump) of a channel 2. A graphical faceplate 380 is a graphical faceplate corresponding to a field device (for example, a gas sensor) of a channel 3. A graphical faceplate 390 is a graphical faceplate corresponding to a field device (for example, a valve) of a channel 4. Each of the graphical faceplates 360 to 390 includes a first display area 325 and a second display area 326.

An operational mode 321, a process value 322, a set value 323, and an operation value 324 are displayed on the first display area 325. The operational mode 321 includes a manual mode and an auto mode. The manual mode (MAN) is displayed in the example shown in FIG. 3. The process value 322 is a measurement value measured by the field device 100. The set value 323 is a value set as a target value of the process value 322. The operation value 324 is a value of an operation performed with respect to the field device 100.

A bar graph 361 and a switching button 364 are displayed on the second display area 326 of the graphical faceplate 360. The bar graph 361 is a graph which represents the process value 322 of the field device 100. The switching button 364 is a button for switching the graphical faceplate to a sub screen 1 (reset button display screen).

A reset button 371, a switching button 374, and a switching button 375 are displayed on the second display area 326 of the graphical faceplate 370. The reset button 371 is a button for canceling an alarm generated in the field device 100. The switching button 374 is a button for switching the graphical faceplate to a main screen. The switching button 375 is a button for switching the graphical faceplate to a sub screen 2 (MOV button display screen).

Three state display areas 381 to 383 and a switching button 385 are displayed on the second display area 326 of the graphical faceplate 380. One of the three state display areas 381 to 383 is lighted in accordance with the process value 322 of the field device 100. The state display area 381 represents that the field device 100 is in an alert state. The state display area 382 represents that the field device 100 is in a caution state. The state display area 383 represents that the field device 100 is in a normal state. The switching button 385 is a button for switching the graphical faceplate to a sub screen 1 (reset button display screen).

A bar graph 391 and a switching button 394 are displayed on the second display area 326 of the graphical faceplate 390. The bar graph 391 is a graph which represents the process value 322 of the field device 100. The switching button 394 is a button for switching the graphical faceplate to a sub screen 1 (reset button display screen).

As shown in FIG. 3, the graphical faceplates 360, 380, and 390 are main screens (first graphical faceplates) in which a state of the field device 100 is shown. On the other hand, the graphical faceplate 370 is a sub screen (second graphical faceplate) for operating the field device 100.

Figure 4A:
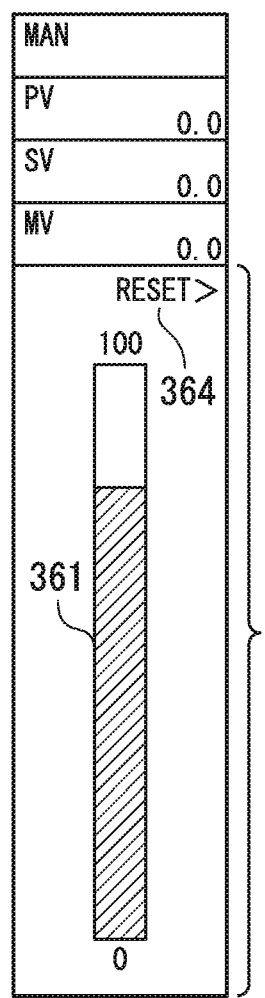
FIG. 4A is a drawing illustrating the main screen (bar graph display screen) of the graphical faceplate 360 of the first embodiment.
Figure 4B:
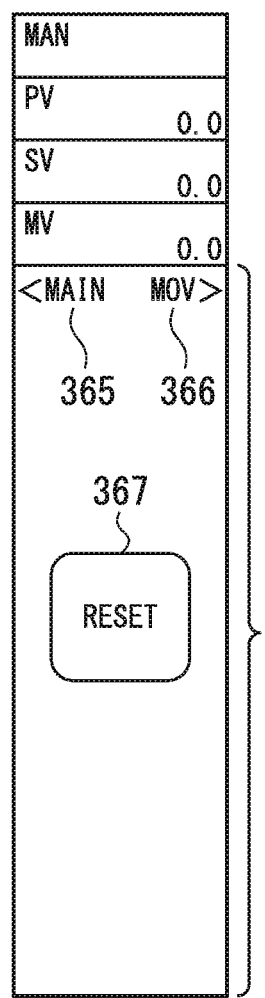
FIG. 4B is a drawing illustrating the sub screen 1 (reset button display screen) of the graphical faceplate 360 of the first embodiment.
Figure 4C:
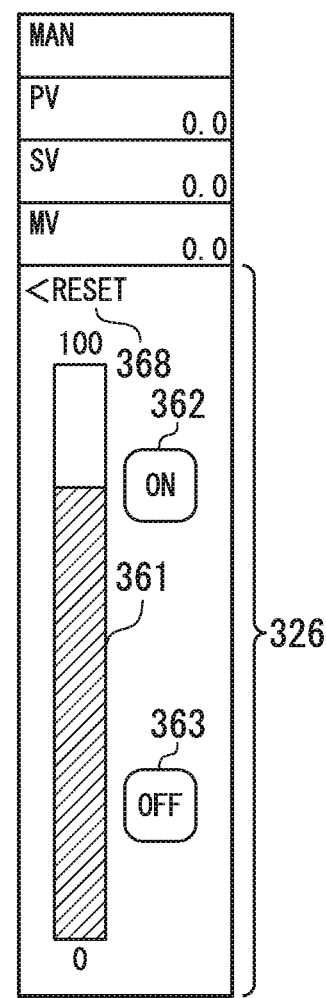
FIG. 4C is a drawing illustrating the sub screen 2 (MOV button display screen) of the graphical faceplate 360 of the first embodiment.

FIG. 4A to FIG. 4C are drawings respectively illustrating a main screen, a sub screen 1, and a sub screen 2 displayed on the display 320 of the first embodiment. In FIG. 4A to FIG. 4C, a screen transition of the graphical faceplate 360 is shown as an example. FIG. 4A is a drawing illustrating the main screen (bar graph display screen) of the graphical faceplate 360. FIG. 4B is a drawing illustrating the sub screen 1 (reset button display screen) of the graphical faceplate 360. FIG. 4C is a drawing illustrating the sub screen 2 (MOV button display screen) of the graphical faceplate 360.

The main screen (bar graph display screen) is a graphical faceplate showing a state of the field device 100. The sub screen 1 (reset button display screen) and the sub screen 2 (MOV button display screen) are graphical faceplates for operating the field device 100.

As shown in FIG. 4A, the main screen (bar graph display screen) is displayed on the display 320. The operator can understand the state of the field device 100 by checking the main screen.

If the measurement value (process value 322) of the field device 100 exceeds a predetermined threshold value, the field device 100 outputs an alarm. Once the field device 100 outputs an alarm, the alarm cannot be canceled if a power source of the field device 100 is not reset. This is because it is necessary to cancel the alarm after the operator understands the cause of the alarm and copes with the alarm.

It is necessary that a relay turns off a line for supplying electric power to the field device 100 in order to reset the power source of the field device 100. Therefore, the operator performs operation for switching the main screen displayed on the display 320 to the sub screen 1 (reset button display screen). Specifically, if the operator selects the switching button 364 by operating the operation input unit 400, the controller 330 switches the main screen (FIG. 4A) displayed in the second display area 326 of the display 320 to the sub screen 1 (FIG. 4B).

As shown in FIG. 4B, a reset button 367, a switching button 365, and a switching button 366 are displayed on the sub screen 1 (reset button display screen). In order to perform reset instructions to the field device 100, the operator selects the reset button 367 by operating the operation input unit 400. If the reset button 367 is selected, the controller 330 transmits a reset signal from the communicator 350 to the control device 200. The control device 200 turns off a relay to cut off the line for supplying electric power to the field device 100 in accordance with the reset signal received from the communicator 350, and the control device 200 turns on the relay after that. Thereby, the field device 100 can be reset, and the alarm can be canceled.

In FIG. 4B, if the operator selects the switching button 365 by operating the operation input unit 400, the controller 330 switches the sub screen 1 (FIG. 4B) displayed on the display 320 to the main screen (FIG. 4A). On the other hand, if the operator selects the switching button 366 by operating the operation input unit 400, the controller 330 switches the sub screen 1 (FIG. 4B) displayed in the second display area 326 of the display 320 to the sub screen 2 (FIG. 4C).

As shown in FIG. 4C, a bar graph 361, an on-button 362, an off-button 363, and a switching button 368 are displayed on the sub screen 2 (MOV button display screen). The operator can perform a maintenance override operation from the sub screen 2 (MOV button display screen).

The maintenance override is performed while maintenance (repair) is conducted at the place where the field device 100 is installed. If the maintenance override is performed, the control device 200 forcibly uses a predetermined default value for a calculation sequence, without using a measurement value of the field device 100. Thereby, occurrence of alarm can be suppressed.

In FIG. 4C, if the operator selects the on-button 362 by operating the operation input unit 400, the controller 330 transmits a maintenance override setting signal from the communicator 350 to the control device 200. The control device 200 forcibly uses the predetermined default value for the calculation sequence in accordance with the maintenance override setting signal received from the communicator 350, without using the measurement value of the field device 100. Thereby, occurrence of alarm can be suppressed.

In FIG. 4C, if the operator selects the off-button 363 by operating the operation input unit 400, the controller 330 transmits a maintenance override canceling signal from the communicator 350 to the control device 200. The control device 200 stops using forcibly the predetermined default value for the calculation sequence in accordance with the maintenance override canceling signal received from the communicator 350.

In FIG. 4C, if the operator selects the switching button 368 by operating the operation input unit 400, the controller 330 switches the sub screen 2 (FIG. 4C) displayed in the second display area 326 of the display 320 to the sub screen 1 (FIG. 4B).

If the display 320 displays the sub screen 1 (reset button display screen) and the sub screen 2 (MOV button display screen) as a new window, the graphical faceplate is covered with the window and visibility worsens. Moreover, the operator needs to memorize a channel which corresponds to the window of the displayed sub screen, and a risk of the operator's operation mistake caused by lapse of memory increases.

For this reason, in the present embodiment, the controller 330 displays the sub screen 1 (reset button display screen) and the sub screen 2 (MOV button display screen) in the second display area 326 by switching screen. Thereby, visibility of the graphical faceplate displayed on the display 320 can be improved, and the operator's operation mistake can be prevented. Moreover, since one step is needed when switching to the reset screen, there can be time interval, and operation mistake of resetting in haste can be reduced.

In the present embodiment, the controller 330 switches the graphical faceplate displayed on the display 320 in accordance with the operator's operation with respect to the operation input unit 400, but not limited thereto. For example, the controller 330 may switch the graphical faceplate displayed on the display 320 in accordance with flick operation with respect to the touch panel 310.

The controller 330 pray switch the graphical faceplate displayed on the display 320 in accordance with tap operation with respect to the touch panel 310. For example, when single-tap operation is perforated, the controller 330 may display the sub screen 1 (reset button display screen) on the display 320. On the other hand, when double-tap operation is performed, the controller 330 may display the sub screen 2 (MOV button display screen) on the display 320.

The controller 330 may display window for selecting any one of the sub screen 1 and the sub screen 2 in accordance with the operator's tap and hold operation with respect to the touch panel 310. Thus, the touch panel 310 can also perform the operation which can be performed by the operation input unit 400.

A sensor which detects an operator's gesture may be used as the operation input unit 400. In this case, the controller 330 may switch the graphical faceplate displayed on the display 320 in accordance with the operator's gesture detected by the sensor. Input devices, such as a trackball, a joy stick, and a camera, may be used as the operation input unit 400.

If a sub screen is displayed on each of channels, a risk where the operator mistakenly operates the graphical faceplate arises. For this reason, with respect to graphical faceplates of channels displayed on the display 320, the controller 330 limits, to one, a number of the graphical faceplates which can be switched from the main screen (first graphical faceplate) to the sub screen (second graphical faceplate). Thereby, the risk of the operator's operation mistake can be reduced.

Figure 5:
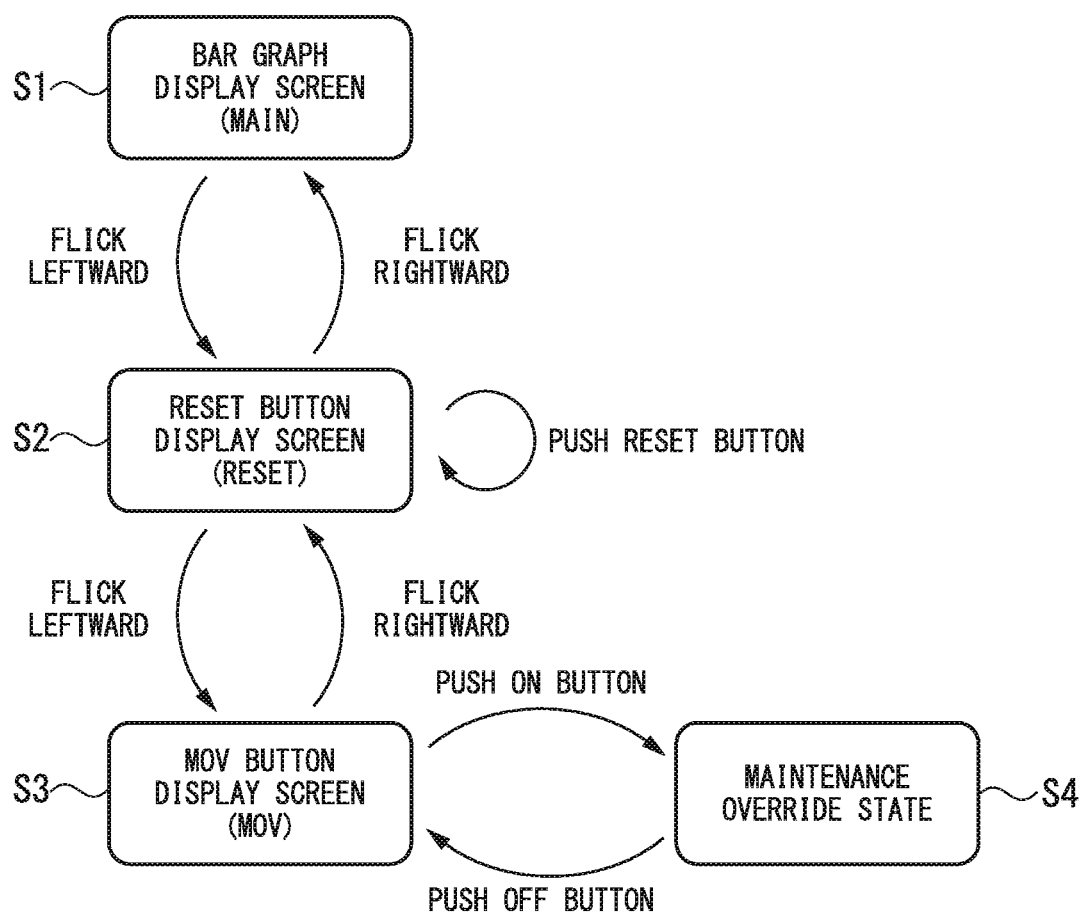
FIG. 5 is a drawing illustrating a screen transition of the graphical faceplate displayed on the display 320 of the first embodiment.

FIG. 5 is a drawing illustrating a screen transition of the graphical faceplate displayed on the display 320 of the first embodiment. Hereinafter, in order to describe simply, an example that the controller 330 switches the graphical faceplate displayed on the display 320 in accordance with flick operation with respect to the touch panel 310 will be described.

If the information processing device 300 is in an initial state, the controller 330 displays a main screen (bar graph display screen) shown in FIG. 4A on the display 320 (Step S1). In the main screen (bar graph display screen), if a left flick is performed by the operator on the touch panel 310, the controller 330 displays the sub screen 1 (reset button display screen) shown in FIG. 4B on the display 320 (Step S2).

In the sub screen 1 (reset button display screen), if the reset button 367 is selected by the operator on the touch panel 310, the controller 330 transmits a reset signal from the communicator 350 to the control device 200. The control device 200 turns off the line for supplying electric power to the field device 100 by using a relay in accordance with the reset signal received from the communicator 350. Thereafter, the control device 200 turns on the relay. Thereby, the field device 100 can be reset and the alarm can be canceled.

In the sub screen 1 (reset button display screen), if right flick is performed by the operator on the touch panel 310, the controller 330 displays, on the display 320, the main screen (bar graph display screen) shown in FIG. 4A (Step S1).

On the other hand, in the sub screen 1 (reset button display screen), if left flick is performed by the operator on the touch panel 310, the controller 330 displays, on the display 320, the sub screen 2 (MOV button display screen) shown in FIG. 4C (Step S3).

In the sub screen 2 (MOV button display screen), if right flick is performed by the operator on the touch panel 310, the controller 330 displays, on the display 320, the sub screen 1 (reset button display screen) shown in FIG. 4B (Step S2).

On the other hand, in the sub screen 2 (MOV button display screen), if the on-button 362 is selected by the operator on the touch panel 310, the controller 330 transmits a maintenance override setting signal from the communicator 350 to the control device 200. The control device 200 forcibly uses a predetermined default value a calculation sequence in accordance with the maintenance override setting signal received from the communicator 350, without using the measurement value from the field device 100 (Step S4).

Thereafter, if the off-button 363 is selected by the operator on the touch panel 310, the controller 330 transmits a maintenance override canceling signal from the communicator 350 to the control device 200. The control device 200 stops using forcibly the predetermined default value for the calculation sequence in accordance with the maintenance override canceling signal received from the communicator 350.

By the present embodiment, since only a graphical faceplate corresponding to a channel of an operation target is switched, it can be prevented that the operator mistakenly operates a graphical faceplate of a channel which is not the operation target. If a portable tablet terminal to which touch-panel operation can be performed is used as the information processing device 300, there is a restriction of screen size. Also in this case, the operator's operation mistake can be prevented, and the screen space can be used efficiently.

As described above, the information processing device 300 includes the controller 330 which switches the main screen (first graphical faceplate) displayed on the display 320 to the sub screen (second graphical faceplate) for performing operation with respect to the field device 100 (control target) based on an operation performed by using the operation unit (the touch panel 310 or the operation input unit 400). Thereby, visibility of the graphical faceplate can be improved, and a risk of the operator's operation mistake can be reduced.

Second Embodiment

FIG. 6A to FIG. 6D are drawings respectively illustrating a main screen, a sub screen 1, a sub screen 2, and a group operation window, which are displayed on the display 320 of the second embodiment. The second embodiment differs from the first embodiment in that a group operation button 369 is displayed on the sub screen 2 (MOV button display screen). Moreover, the second embodiment differs from the first embodiment in that a group operation window 500 is displayed on the display 320. Hereinafter, the second embodiment will be described in detail.

Figure 6A:
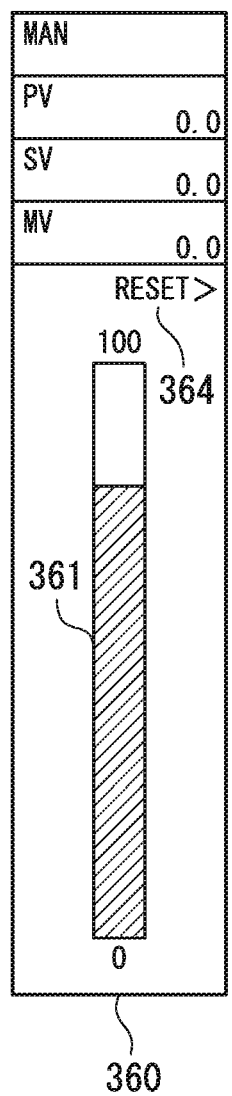
FIG. 6A is a drawing illustrating the main screen (bar graph display screen) of the graphical faceplate 360 of the second embodiment.
Figure 6B:
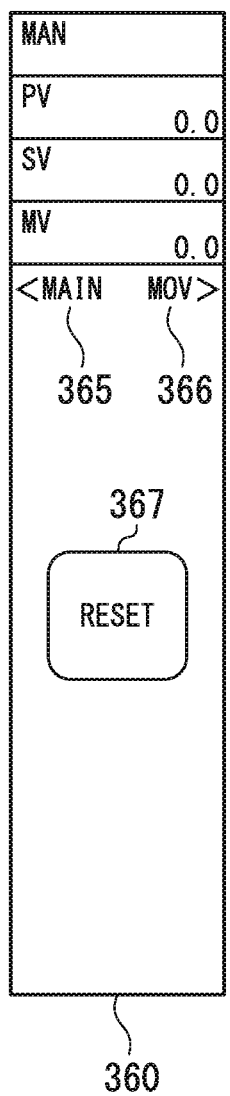
FIG. 6B is a drawing illustrating the sub screen 1 (reset button display screen) of the graphical faceplate 360 of the second embodiment.
Figure 6C:
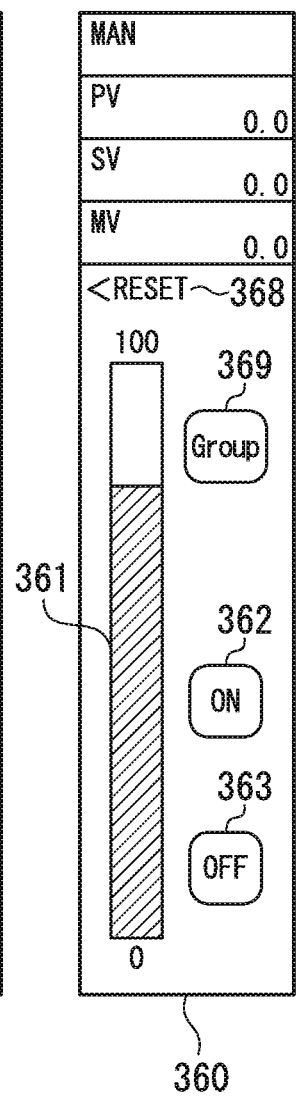
FIG. 6C is a drawing illustrating the sub screen 2 (MOV button display screen) of the graphical faceplate 360 of the second embodiment.
Figure 6D:
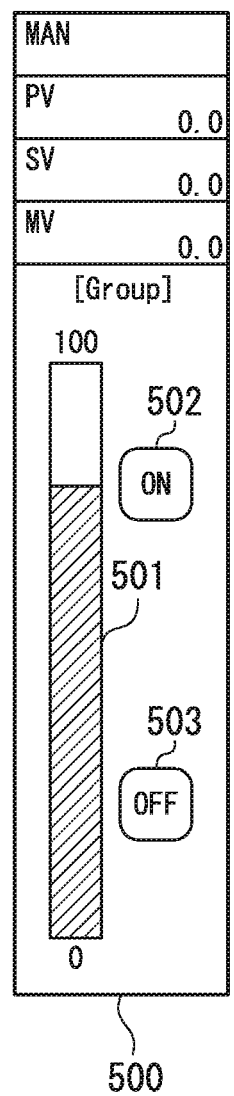
FIG. 6D is a drawing illustrating the group operation window 500 of the second embodiment.

FIG. 6A is a drawing illustrating the main screen (bar graph display screen) of the graphical faceplate 360. FIG. 6B is a drawing illustrating the sub screen 1 (reset button display screen) of the graphical faceplate 360. FIG. 6C is a drawing illustrating the sub screen 2 (MOV button display screen) of the graphical faceplate 360. FIG. 6D is a drawing illustrating the group operation window 500. Since FIG. 6A and FIG. 6B of the second embodiment is the same as FIG. 4A and FIG. 4B of the first embodiment, the explanation of FIG. 6A and FIG. 6B will be omitted.

For example, if a fire breaks out in the plant, an alarm is output from the field devices 100 (a flame sensor, a gas sensor, a smoke sensor, and so on). If instructions of reset and maintenance override are performed sequentially one by one to these field devices 100, the operator's work is complicated. Therefore, in the present embodiment, the same operation can be performed with respect to these field devices 100 by one operation.

As shown FIG. 6C, a bar graph 361, an on-button 362, an off-button 363, a switching button 368, and a group operation button 369 are displayed on the sub screen 2 (MOV button display screen). The operator can perform a maintenance override operation from the sub screen 2 (MOV button display screen).

In FIG. 6C, if the operator selects the group operation button 369 by operating the operation input unit 400, the controller 330 displays, on the display 320, the group operation window 500 shown in FIG. 6D.

As shown in FIG. 6D a bar graph 501, an on-button 502, and an off-button 503 are displayed in the group operation window 500. If the operator selects the on-button 502 by operating the operation input unit 400, the maintenance override with respect to the field devices 100 grouped beforehand is set. Channels which are to be grouped may be set at a time of engineering.

Specifically, the controller 330 transmits a maintenance override setting signal, with respect to each of the field devices 100 grouped beforehand, from the communicator 350 to the control device 200. If the control device 200 has received the maintenance override setting signal from the communicator 350, the control device 200 sets the maintenance override with respect to the field devices 100.

Thereby, the operator can set the maintenance override with respect to the field devices 100 by one operation, and efficiency of the operator's work can be improved.

If the operator selects the off-button 503 by operating the operation input unit 400, the maintenance override with respect to the field devices 100 grouped beforehand is canceled.

Specifically, the controller 330 transmits the maintenance override canceling signal, with respect to each of the field devices 100 grouped beforehand, from the communicator 350 to the control device 200. The control device 200 cancels the maintenance override with respect to the field devices 100 in accordance with the maintenance override canceling signal received from the communicator 350.

Thereby, the operator can cancel the maintenance override with respect to the field devices 100 by one operation, and efficiency of the operator's work can be improved.

As described above, if the group operation button 369 has been selected, the controller 330 displays, on the display 320 the group operation window 500 for simultaneously operating a plurality of the field devices 100. Thereby, the operator can perform operation with respect to the field devices 100 by one operation, efficiency of the operator's work can be improved.

Third Embodiment

Figure 7:
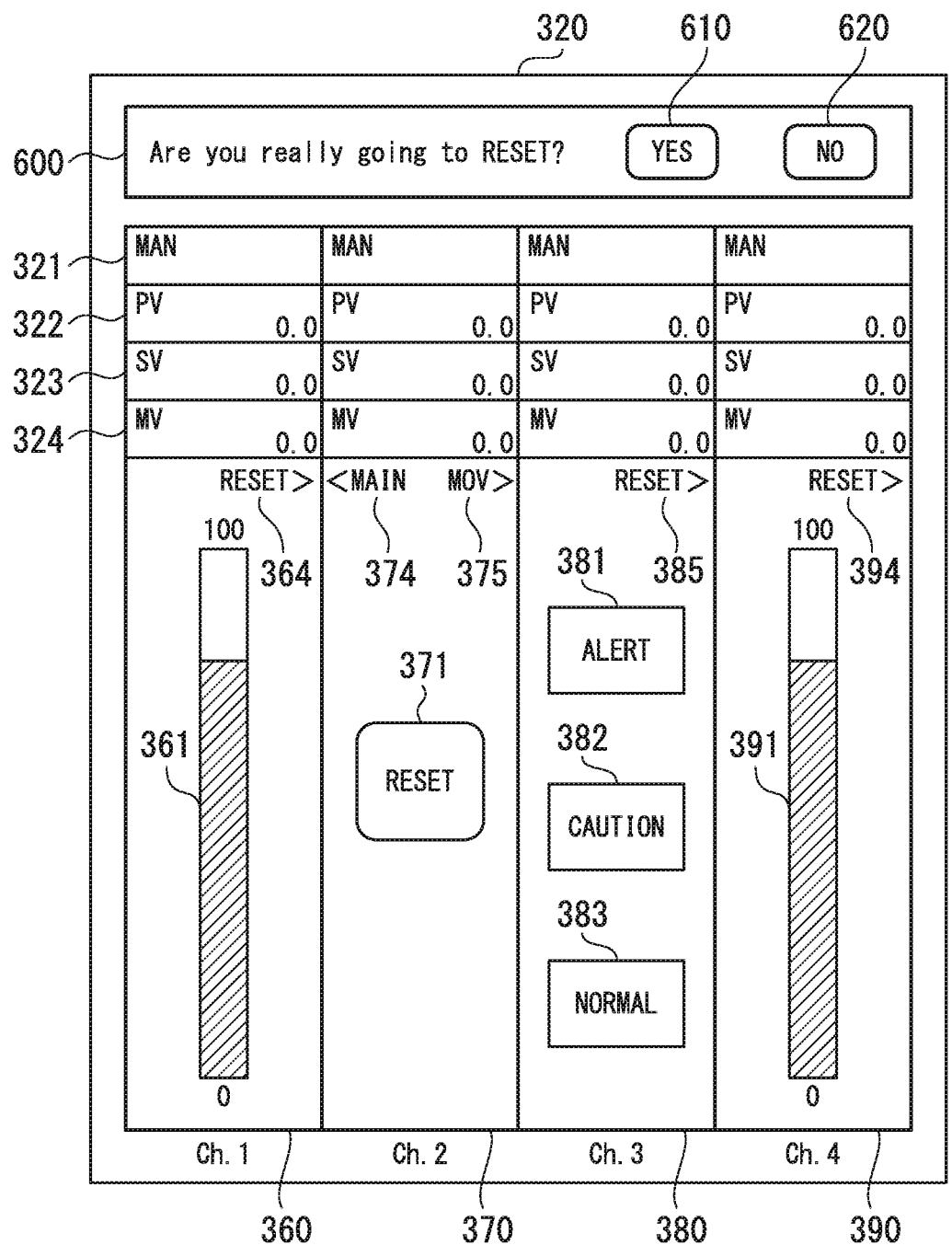
FIG. 7 is a drawing illustrating a graphical faceplate displayed on the display 320 of the third embodiment.

FIG. 7 is a drawing illustrating a graphical faceplate displayed on the display 320 of the third embodiment. The third embodiment differs from the first embodiment in that a confirmation window 600 with respect to an operation in the sub screen is displayed on the display 320. Hereinafter, the third embodiment will be described in detail.

As shown in FIG. 7, graphical faceplates 360, 370, 380, and 390 respectively corresponding to four channels are displayed on the display 320. The graphical faceplates 360, 380, and 390 are main screens, and the graphical faceplate 370 is a sub screen 1.

In the graphical faceplate 370, if the operator selects the reset button 371 by operating the operation input unit 400, the controller 330 displays the confirmation window 600 on the display 320. A confirmation message representing "Are you really going to RESET?", a YES-button 610, and a NO-button 620 are displayed on the confirmation window 600.

If the operator selects the YES-button 610 by operating the operation input unit 400, the controller 330 transmits a reset signal from the communicator 350 to the control device 200. The control device 200 turns off the line for supplying electric power to the field device 100 by using a relay in accordance with the reset signal received from the communicator 350. Thereafter, the control device 200 turns on the relay. Thereby, the field device 100 can be reset and the alarm can be canceled.

On the other hand, if the operator selects the NO-button 620 by operating the operation input unit 400, the controller 330 eliminates the confirmation window 600 from the display 320, without transmitting a reset signal to the control device 200.

Thereby, even if the operator has mistakenly selected the reset button 371, it can be avoided from performing a reset operation with respect to the field device 100, and a risk of the operator's operation mistake can be further reduced.

If the display 320 displays the confirmation window 600 in the sub screen, in a case that the operator has mistakenly hit the sub screen repeatedly, there is a risk of operation mistake. For this reason, the display 320 displays the confirmation window 600 at a position which does not overlap with any one of the graphical faceplates.

As described above, the display 320 displays the confirmation window 600 with respect to an operation in a sub screen (second graphical faceplate) at a position which does not overlap with any one of graphical faceplates. Thereby, a risk of the operator's operation mistake can be further reduced.

Fourth Embodiment

FIG. 8A to FIG. 8C are drawings respectively illustrating a main screen, a sub screen 1, and a sub screen 2, which are displayed on the display 320 of the fourth embodiment. The fourth embodiment differs from the first embodiment in that a mark 700 is displayed on the display 320. Hereinafter, the fourth embodiment will be described in detail.

FIG. 8A is a drawing illustrating a main screen (bar graph display screen) of the graphical faceplate 360. FIG. 8B is a drawing illustrating a sub screen 1 (reset button display screen) of the graphical faceplate 360. FIG. 8C is a drawing illustrating a sub screen 2 (MOV button display screen) of the graphical faceplate 360.

As shown in FIG. 8A to FIG. 8C, the mark 700 is displayed on the bottom of the graphical faceplate. Three round marks are included in the mark 700. In FIG. 8A, the leftmost round mark is black, and the other two round marks are white. In FIG. 8B, the central round mark is black, and the other two round marks are white. In FIG. 8C, the rightmost round mark is black, and the other two round marks are white.

In the mark 700, the number of the round marks represents a total number of the main screen and the sub screen. The black round mark represents a position of the graphical faceplate currently displayed. Thereby, the operator can understand, at a glance, the total number of the main screen and the sub screen, and the position of the graphical faceplate which is currently displayed, without screen transition.

If the operator selects the white round mark by operating the operation input unit 400, the controller 330 displays, on the display 320, a screen corresponding to the selected white round mark. Thereby, the operator can perform screen transition easily.

As described above, the display 320 displays the mark 700 in the main screen and the sub screen. The mark 700 represents the total number of the main screen and the sub screen, and represents the position of a graphical faceplate which is currently displayed. Thereby, the operator can understand, at a glance, the total number of the main screen and the sub screen, and the position of the graphical faceplate which is currently displayed, without screen transition.

Fifth Embodiment

Figure 9A:
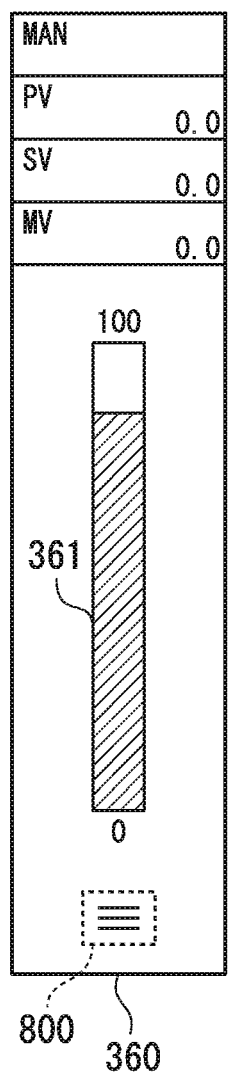
FIG. 9A is a drawing illustrating a main screen (bar graph display screen) of the graphical faceplate 360 of the fifth embodiment.
Figure 9B:
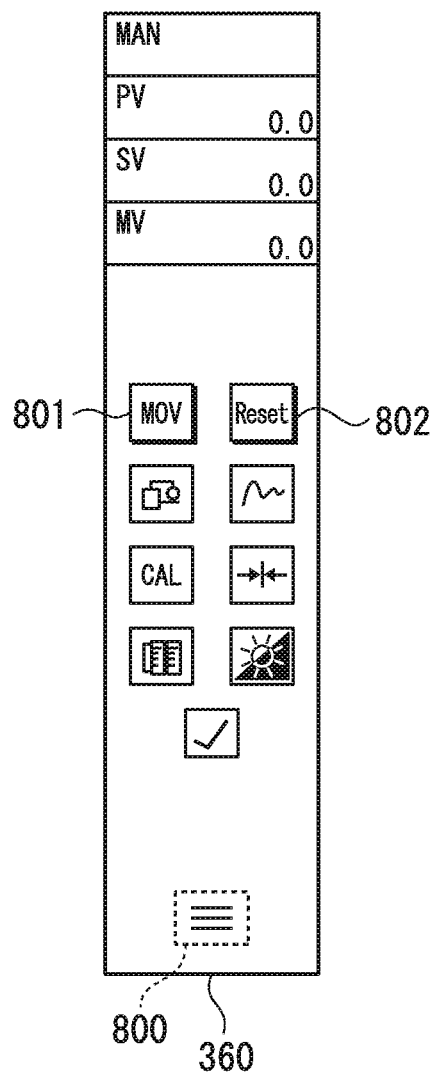
FIG. 9B is a drawing illustrating the selection screen of the graphical faceplate 360 of the fifth embodiment.
Figure 9C:
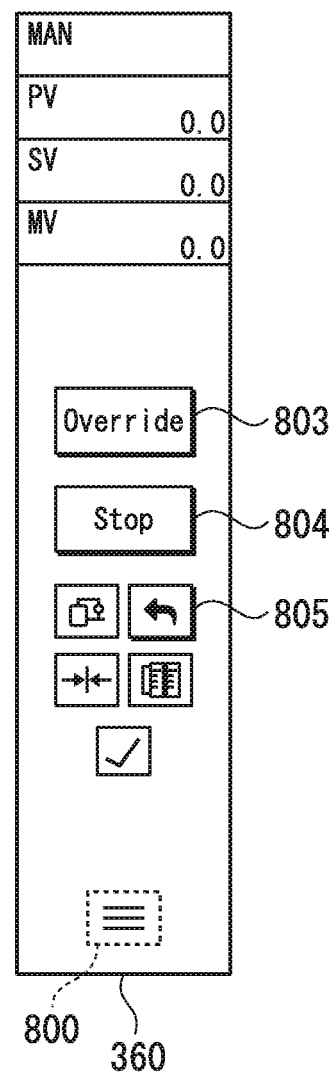
FIG. 9C is a drawing illustrating the sub screen 2 (MOV button display screen) of the graphical faceplate 360 of the fifth embodiment.

FIG. 9A to FIG. 9C are drawings respectively illustrating a main screen, a selection screen, and a sub screen 2, which are displayed on the display 320 of the fifth embodiment. The fifth embodiment differs from the first embodiment in that the relevant operation call button 800 for displaying a selection screen is displayed on a graphical faceplate. Hereinafter, the fifth embodiment will be described in detail.

FIG. 9A is a drawing illustrating a main screen (bar graph display screen) of the graphical faceplate 360. FIG. 9B is a drawing illustrating selection screen of the graphical faceplate 360. FIG. 9C is a drawing illustrating the sub screen 2 (MOV button display screen) of the graphical faceplate 360.

As shown in FIG. 9A to FIG. 9C, the relevant operation call button 800 is displayed on the bottom of the graphical faceplate. In the main screen (bar graph display screen) of the graphical faceplate 360 shown in FIG. 9A, if the operator selects the relevant operation call button 800 by operating the operation input unit 400, the controller 330 switches the main screen (bar graph display screen) displayed on the display 320 to the selection (FIG. 9B).

As shown in FIG. 9B, a plurality of switching buttons for switching the screen is displayed on the selection screen. If the operator selects the switching button 801 by operating the operation input unit 400, the controller 330 switches the selection screen displayed on the display 320 to the sub screen 2 (FIG. 9C). If the operator selects the switching button 802 by operating the operation input unit 400, the controller 330 switches the selection screen displayed on the display 320 to the sub screen 1 (reset button display screen).

As shown in FIG. 9C, an override button 803, a stop button 804, and a returning button 805 are displayed on the sub screen 2 (MOV button display screen). The override button 803 corresponds to the on-button 362 shown in FIG. 4C, and the stop button 804 corresponds to the off-button 363 shown in FIG. 4C.

In FIG. 9C, if the operator selects the override button 803 by operating operation input unit 400, the controller 330 transmits a maintenance override setting signal from the communicator 350 to the control device 200. The control device 200 forcibly uses a predetermined default value for a calculation sequence in accordance with the maintenance override setting signal received from the communicator 350, without using the measurement value from the field device 100. Thereby, occurrence of alarm can be suppressed.

In FIG. 9C, if the operator selects the stop button 804 by operating the operation input unit 400, the controller 330 transmits a maintenance override canceling signal from the communicator 350 to the control device 200. The control device 200 stops using forcibly the predetermined default value for the calculation sequence in accordance with the maintenance override canceling signal received from the communicator 350.

In FIG. 9C, if the operator selects the returning button 805 by operating the operation input unit 400, the controller 330 switches the sub screen 2 (MOV button display screen) displayed on the display 320 to the main screen (FIG. 9A).

If a graphical faceplate has many sub screens, the operator's procedure of switching the screen may become complicated. For example, in the first embodiment, if a graphical faceplate has eight sub screens, it may be required for the operator to switch the screen a maximum of eight times in order to display a desired sub screen on the display 320.

On the other hand, in the fifth embodiment, the operator can display the desired sub screen on the display 320, if the operator selects one of the eight switching buttons displayed on the e selection screen (FIG. 9B). For this reason, by the fifth embodiment, the operator's work load of switching the screen of graphical faceplate can be reduced.

As described above, the display 320 can alternatively display the sub screens (second graphical faceplate), and display the selection screen (FIG. 9B) for selecting any one of the sub screens (second graphical faceplate). Thereby, even if there are many sub screens, the operator's work load of switching the screen of graphical faceplate can be reduced.

In at least one embodiment described above, the information processing device 300 includes the controller 330 which switches the main screen (first graphical faceplate) displayed on the display 320 to the sub screen (second graphical faceplate) for performing operation with respect to the field device 100 (control target) based on an operation performed by using the operation unit (the touch panel 310 or the operation input unit 400). Thereby, visibility of the graphical faceplate can be improved, and a risk of the operator's operation mistake can be reduced.

Data required for the operator's field device monitoring work is displayed on the main screen (first graphical faceplate and data for completing a work for every purpose of operation (reset and maintenance override) and operation parts are displayed on the sub screen (second graphical faceplate). Thereby, each work can be completed in each screen.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the e present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention not to be considered as being limited by the foregoing description, and is only limited by the scope of the claims.

What is claimed is:

1. An information processing device comprising:
a display configured to display a plurality of graphical faceplates side by side, the graphical faceplates corresponding to control targets respectively, the graphical faceplates representing states of the control targets respectively, a main screen being displayed in a display area of each of the graphical faceplates;
an operation unit which is a hardware device to which an operator performs operations to operate the graphical faceplates; and
a controller which is implemented by a processor and a memory storing a program executed by the processor, the controller being configured to switch the main screen of one of the graphical faceplates displayed in the display area to a sub screen for operating the control target of the one of the graphical faceplates based on an operation performed by the operation unit, wherein a sub screen is provided for each of the graphical faceplates, wherein the main screen for each of the graphical faceplates displays a state of the graphical faceplate's corresponding control target, and does not display an input portion for operating the graphical faceplate's corresponding control target, wherein the sub screen for operating the control target of the one of the graphical faceplates displays the input portion for operating the control target of the one of the graphical faceplates, and does not display the state of the control target of the one of the graphical faceplates, and wherein in response to the switching of the main screen of the one of the graphical faceplates to the sub screen for operating the control target of the one of the graphical faceplates, the controller prohibits the main screen displayed in the display area of another graphical faceplate of the plurality of the graphical faceplates from being switched to the sub screen of the another graphical faceplate.

2. The information processing device according to claim 1,
wherein the display is configured to display, in the main screen of the one of the graphical faceplates, a bar graph representing a process value of the control target.

3. The information processing device according to claim 1, wherein the display is configured to display, in the sub screen of the one of the graphical faceplates, a reset button for resetting the control target.

4. The information processing device according to claim 1, wherein the display is configured to display, in the sub screen of the one of the graphical faceplates, an override button for forcibly transmitting a predetermined default value to the control target.

5. The information processing device according to claim 1, wherein one of the control targets is a field device installed in a plant.

6. The information processing device according to claim 1,
wherein the operation unit is a touch panel to which an operator performs flick operation, and
wherein the controller is configured to switch the main screen of the one of the graphical faceplates displayed by the display to the sub screen of the one of the graphical faceplates based on the flick operation.

7. The information processing device according to claim 1,
wherein the operation unit is a touch panel to which an operator performs tap operation, and
wherein the controller is configured to switch the main screen of the one of the graphical faceplates displayed by the display to the sub screen of the one of the graphical faceplates based on the tap operation.

8. The information processing device according to claim 1,
wherein the display is configured to display a switching button for switching a screen,
wherein the operation unit is a mouse for selecting the switching button displayed by the display, and
wherein the controller is configured to switch the main screen of the one of the graphical faceplates displayed by the display to the sub screen of the one of the graphical faceplates if the switching button is selected by the mouse.

9. The information processing device according to claim 1, further comprising:
a sensor configured to detect an operator's gesture,
wherein the controller is configured to switch the main screen of the one of the graphical faceplates displayed by the display to the sub screen of the one of the graphical faceplates in accordance with the gesture detected by the sensor.

10. The information processing device according to claim 1,
wherein the display is configured to display a group operation button in the sub screen of the one of the graphical faceplates, and
wherein if the group operation button has been selected by using the operation unit, the controller displays, on the display, a group operation window for simultaneously operating a plurality of control targets.

11. The information processing device according to claim 1,
wherein the display is configured to display a confirmation window for an operation in the sub screen of the one of the graphical faceplates at a position which does not overlap with the main screen of the one of the graphical faceplates and the sub screen of the one of the graphical faceplates.

12. The information processing device according to claim 1,
wherein the display is configured to display a mark in the main screen of the one of the graphical faceplates and the sub screen of the one of the graphical faceplates, and
wherein the mark represents a total number of the main screen of the one of the graphical faceplates and the sub screen of the one of the graphical faceplates, and represents a position of a graphical faceplate which is currently displayed.

13. The information processing device according to claim 1,
wherein the display is configured to alternatively display the sub screens, and display a selection screen for selecting any one of the sub screens.

14. A displaying method comprising:
displaying, by a display, a plurality of graphical faceplates side by side, the graphical faceplates corresponding to control targets respectively, the graphical faceplates representing states of the control targets respectively, a main screen being displayed in a display area of each of the graphical faceplates;
operating the graphical faceplates by an operation unit which is a hardware device to which an operator performs operations to operate the graphical faceplates; and
switching, by a controller, the main screen of one of the graphical faceplates displayed in the display area to a sub screen for operating the control target of the one of the graphical faceplates based on an operation performed by the operation unit, the controller being implemented by a processor and a memory storing a program executed by the processor,
wherein a sub screen is provided for each of the graphical faceplates,
wherein the main screen for each of the graphical faceplates displays a state of the graphical faceplate's corresponding control target, and does not display an input portion for operating the graphical faceplate's corresponding control target, wherein the sub screen for operating the control target of the one of the graphical faceplates displays the input portion for operating the control target of the one of the graphical faceplates, and does not display the state of the control target of the one of the graphical faceplates, and wherein in response to the switching of the main screen of the one of the graphical faceplates to the sub screen for operating the control target of the one of the graphical faceplates, prohibiting, by the controller, the main screen displayed in the display area of another graphical faceplate of the plurality of the graphical faceplates from being switched to the sub screen of the another graphical faceplate.

15. The displaying method according to claim 14, further comprising:

displaying, by the display, a bar graph representing a process value of the control target in the main screen of the one of the graphical faceplates.

16. The displaying method according to claim 14, further comprising:

displaying, by the display, a reset button for resetting the control target in the sub screen of the one of the graphical faceplates.

17. The displaying method according to claim 14, further comprising:

displaying, by the display, an override button for forcibly transmitting a predetermined default value to the control target in the sub screen of the one of the graphical faceplates.

18. The displaying method according to claim 14, wherein one of the control targets is a field device installed in a plant.

19. An information processing device comprising:

a display configured to display a plurality of graphical faceplates side by side, the graphical faceplates respectively corresponding to sensor devices installed in a plant, each graphical faceplate representing a bar graph representing a process value of a respective sensor device, a main screen being displayed in a display area of each of the graphical faceplates;

an operation unit which is a hardware device to which an operator performs operations to operate the graphical faceplates; and a controller which is implemented by a processor and a memory storing a program executed by the processor, the controller being configured to switch the main screen of one of the graphical faceplates displayed in the display area to a sub screen based on an operation performed by the operation unit, the sub screen displaying a reset button for resetting one of the sensor devices or an override button for forcibly transmitting a predetermined default value to the one of the sensor devices, wherein a sub screen is provided for each of the graphical faceplates, and wherein in response to the switching of the main screen of the one of the graphical faceplates to the sub screen of the one of the graphical faceplates, the controller prohibits the main screen displayed in the display area of another graphical faceplate of the plurality of the graphical faceplates from being switched to the sub screen of the another graphical faceplate.

20. The information processing device according to claim 19, wherein one of the sensor devices is a smoke sensor.

* * * * *